(12) United States Patent
Buzov

(10) Patent No.: US 10,689,055 B2
(45) Date of Patent: Jun. 23, 2020

(54) FOLDED BICYCLE FRAME AND METHOD FOR MAKING THE SAME

(71) Applicant: Alexander Buzov, St.Giljan (MT)

(72) Inventor: Alexander Buzov, St.Giljan (MT)

( * ) Notice: Subject to any disclaimer, the term of this patent is extended or adjusted under 35 U.S.C. 154(b) by 205 days.

(21) Appl. No.: 16/014,230

(22) Filed: Jun. 21, 2018

(65) Prior Publication Data
US 2019/0389528 A1     Dec. 26, 2019

(51) Int. Cl.
*B62K 19/08*     (2006.01)
*B62K 3/02*     (2006.01)

(52) U.S. Cl.
CPC .............. *B62K 19/08* (2013.01); *B62K 3/02* (2013.01)

(58) Field of Classification Search
CPC .................. B62K 3/02; B62K 19/08
USPC ...................................... 280/281.1
See application file for complete search history.

(56) References Cited

U.S. PATENT DOCUMENTS

| | | | | |
|---|---|---|---|---|
| 2,182,828 A | * | 12/1939 | Stutsman | B62K 19/02 280/288.3 |
| 3,233,916 A | * | 2/1966 | Bowden | B62K 19/02 280/274 |
| 4,230,332 A | * | 10/1980 | Porsche | B62J 99/00 280/274 |
| 4,411,333 A | * | 10/1983 | Bothwell | B62J 17/06 180/219 |
| 4,613,146 A | * | 9/1986 | Sharp | B62K 3/02 280/288.2 |
| D385,228 S | * | 10/1997 | Thompson | D12/111 |
| 9,248,880 B2 | * | 2/2016 | Haimoff | B62K 3/02 |

* cited by examiner

*Primary Examiner* — Kevin Hurley
*Assistant Examiner* — Felicia L. Brittman
(74) *Attorney, Agent, or Firm* — Nadya Reingand; Yan Hankin

(57) ABSTRACT

A folded bicycle frame comprising a single and continuous sheet of metal is disclosed. The bicycle frame is formed by cutting the sheet of metal to form a boundary, hydroforming the sheet of metal to create a profile comprising indentations and protrusions along the sheet of metal, and then folding the molded sheet essentially along its axis of symmetry, such that the symmetrical parts of the sheet are positioned next to each other to form the frame with a hollow interior. Holes are precut in the frame so that other bicycle parts may be attached to the frame. The frame is produced without the need for any welding or connecting of individual parts. Thus, it is stronger than conventional bicycle frames which are weaker at such welded connections of their parts. A method for making the folded frame is also disclosed.

20 Claims, 15 Drawing Sheets

FOLDED BICYCLE FRAME AND METHOD FOR MAKING THE SAME

FIELD OF THE INVENTION

This invention relates to an improved bicycle frame and method for making the improved bicycle frame. More particularly, it relates to a lightweight bicycle frame formed by stamping and folding a unitary piece of sheet metal.

BACKGROUND OF THE INVENTION

A recent revival in interest in bicycling has generated a demand for bicycles and bicycle parts, including bicycle frames, in which demand has exceeded the supply. Because the existing manufacturing techniques used in manufacturing conventional bicycle frames make it difficult for manufacturers to quickly increase their capacity, the increased demand for bicycle frames remains unsatisfied and has resulted in an increase in cost.

Conventional bicycle frames are formed of a plurality of tubular members and lugged frame joint fittings that must be individually fabricated and then individually assembled to form the complete frame. The latter process includes assembling the lugged frame joint fittings and the tubular members in a welding and/or brazing the tubular members in the lugged joints, cleaning and grinding the arc welds to form smooth junctions, priming the assembled frame to prevent rust, and, finally, applying the finishing coats of paint. This process is slow and labor intensive and the labor/material cost ratio is high. Thus, a frame that could be fabricated faster and with considerably less expenditure of labor, especially one amenable to automated techniques, would be considerably cheaper and would be most welcome in the industry.

The assembly of the frame components in a welding jig must be performed with considerable care to assure accurate alignment. If the frame is misaligned, the front wheel will track in a non-vertical plane, with the result that bicycle will tend to veer off to one side. Consequently, the rider must continually compensate to hold the bicycle on course, and such a bicycle is tiring to ride and difficult to handle. A bicycle frame that is intrinsically perfectly aligned would eliminate this troublesome problem and would represent a substantial advancement in the art.

The welded or brazed junctions of conventional tubular frames are the most frequent points of failure in conventional bicycles along with scrapes on the painted surface that open bare metal to air and water and—result in rust formation that can spread and disfigure and ultimately weaken the frame unless corrective steps are taken. Thus, a bicycle frame formed of an inert material that would be immune to rust would not require the priming and painting steps. The savings from elimination of the priming and painting steps could be passed on to the buyer, and this in combination with the freedom from maintenance necessary for conventional bicycles would make such a bicycle frame more desirable by a rider. Thus, an inexpensive bicycle frame which could be fabricated of a light and strong material would be greatly welcomed by the industry and the bicycling public.

SUMMARY OF THE INVENTION

The present invention comprises a bicycle frame, including a single sheet of metal, said single sheet of metal being cut to form a boundary of the bicycle frame, said single sheet of metal comprising bulges and curves along said sheet of metal, said bulges and curves resulting from a hydroforming process, said single sheet of metal being essentially symmetrical, said single sheet of metal being folded essentially along its axis of symmetry, wherein a folded form of said single sheet of metal forms the bicycle frame.

In some aspects, a lower back end of the frame is wider than both a lower front end of the frame and an upper back end of the frame. In other words, the distance between lower back ends of the frame is greater than the distances between lower front ends and upper back ends of the frame. This type of design provides additional support in a third dimension and also makes room for the back wheel of the bicycle to be positioned within the frame.

In some aspects, the bicycle frame further comprises a pedal assembly mounted to a lower front end of the bicycle frame via a hole for fixing said pedal assembly, said pedal assembly helping to maintain the frame in a folded form.

In some aspects, the frame further comprises a hole for installing a rear wheel assembly. In some aspects, the frame further comprises a hole for installing a bicycle seat. In some aspects, the frame further comprises a hole for installing a handlebar assembly.

In some aspects, the folded form of the frame comprises a top portion, a front leg, a rear leg, and a connecting portion between said front leg and said rear leg. In some aspects, the frame further comprises a vertical support leg located between said front leg and said rear leg. In some aspects, the angle of the front leg is equal to an angle of the rear leg. In some aspects, the angles are acute angles.

In some aspects, the metal is aluminum. In some aspects, the metal is titanium. In some aspects, the metal is steel.

In some aspects, the frame further comprises a multi-functional box, said multi-functional box being mounted adjacent to the frame, underneath the body, and anterior to the front leg.

In some aspects, the folded form comprises a top portion, a front leg, and a connecting portion between a bottom of said front leg and an end of said top portion.

In some aspects, the folded form comprises at least one triangle. In some aspects, the folded form comprises at least one parallelogram.

In some aspects, a rear end of the frame is wider than the front leg of the frame.

The invention also includes a method for making a bicycle frame, the method comprising (1) providing a single sheet of metal, (2) cutting said single sheet of metal to form a boundary of the bicycle frame, (3) hydroforming said cut single sheet of metal to form bulges and curves along said single sheet of metal, said single sheet of metal with bulges and curves being essentially symmetrical, and (4) folding said single sheet of metal essentially along its axis of symmetry, wherein a folded form of said single sheet of metal forms the bicycle frame.

In some aspects, the method further comprises forming one or more holes in the single sheet of metal.

In some aspects, the metal is aluminum. In some aspects, the metal is titanium. In some aspects, the metal is steel.

In some aspects, the folding of the single sheet of metal forms a frame comprising a top portion, a front leg, a rear leg, and a connecting portion between said front leg and said rear leg.

BRIEF DESCRIPTION OF THE DRAWINGS

FIG. 10A shows a side view in two dimensions. FIG. 10B shows a perspective view in three dimensions. FIG. 10C shows a front view in two dimensions. FIG. 10D shows a perspective view with exemplary dimensions, in millimeters.

FIG. 10A shows a side view.

FIG. 11B shows a top view. FIG. 11C shows a front view.

DETAILED DESCRIPTION OF THE PREFERRED EMBODIMENT

The present invention is an improved bicycle frame produced from a single and continuous sheet of metal which is cut via a guillotine shear (or other device for cutting sheet metal) based on the desired dimensions of the frame. The precut sheet metal is then placed in a hydroforming device to form a pre-shaped one-piece sheet matching the female mold within the die (or a male solid punch) within the hydroforming device. The hydroforming process creates an essentially symmetrically shaped sheet which is then folded (or bent) along a line of symmetry of the essentially symmetric shape. The frame does not require any welding or fixing of individual parts to one another, since the entire frame comprises a single piece of continuous metal.

Additional bicycle parts (e.g., seat, gears, wheels, handlebar, multi-functional box/container, etc.) are attachable to the stamped frame with screws and via preformed holes (holes are made in predetermined positions of the sheet metal during the cutting process). A multi-functional box, or container 16, may be attached to the folded frame, wherein the multi-functional box 16 may be used to store instruments, documents, and other transported material. In addition to providing storage, the multi-functional box 16 acts as a support for the bicycle frame, being positioned in a manner which reduces tension on the frame. By being positioned in such a manner (see, e.g., FIGS. 2 and 3), abutting the folded frame, the multi-functional box 16 reduces strain from the weight of one or two passengers while using a bicycle employing the frame.

During shearing of the molded sheet, prior to folding, all necessary stiffeners, fastenings, and holes are made, such that a single, continuous (unitary) sheet of metal is produced, the single sheet comprising the full design of a bicycle frame which need only be folded to form the proper shape. A single hydroforming process creates a shaped sheet of metal comprising the entire bicycle frame, which then only needs to be folded. Thus, and without requiring additional production steps including but not limited to welding of any kind, the manufacturing process of making a bicycle frame is significantly simplified and reduced in cost and time required for manufacturing. Furthermore, welding leads to weaknesses in the structure of a frame (at the points of welding); thus, the lack of a need for welding to combine parts of the frame leads to a stronger structure throughout the frame, including those parts which would normally require welding (e.g., at the connection of the top bar of a frame and the legs, or vertical bars, of a frame).

Figure 1:
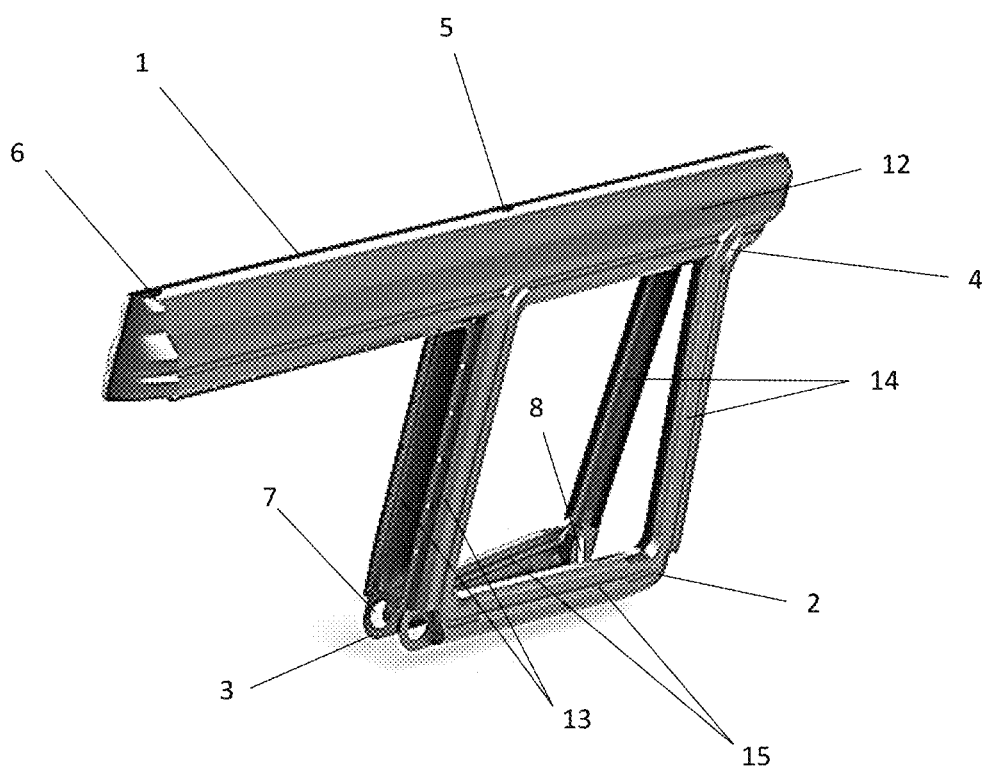
FIG. 1 shows a folded bicycle frame according to the present invention. The shading is provided to particularly illustrate the various possible indentations, curves, and bends of the frame design.
Figure 8:
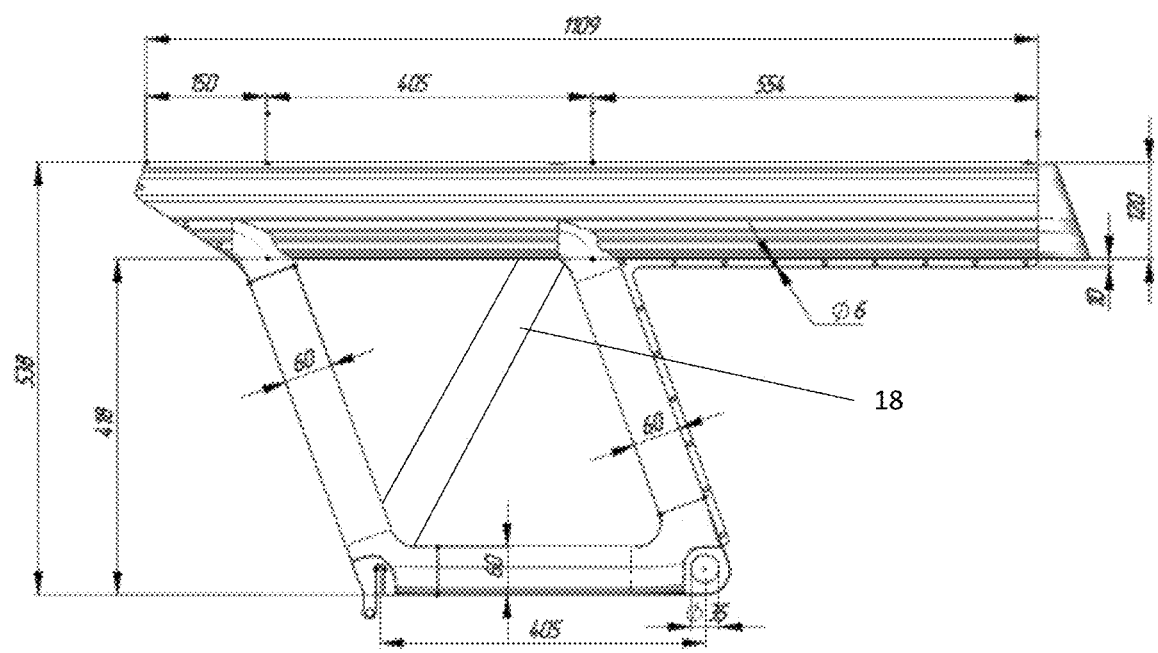
FIG. 8 shows a side view of the bicycle frame with exemplary dimensions, in millimeters.

Referring now to FIG. 1, a single sheet forms the folded bicycle frame 1 of the present invention. The bicycle frame 1 is folded along its axis/line of symmetry 17 such that the folded frame's sides are essentially equally shaped. In other terms, the symmetrical parts of the sheet are folded to meet each other and become positioned next to each other to form a frame comprising an exterior of the metal sheet and a hollow interior. Prior to folding of the frame, the metal undergoes a hydroforming process, wherein protrusions, bulges, and curves are formed in the metal sheet. Prior to hydroforming, the metal is cut to form the outer boundaries of the frame sheet. After folding, the frame essentially comprises a top portion 12 (also referred to as the body of the frame), a front leg 13 (also referred to as front vertical portion), a rear leg 14 (also referred to as the rear vertical portion), and a connecting portion 15 between the front and rear legs. Optionally, the frame may also comprise a vertical support leg 18 which is located between the front leg and the rear leg (not shown in FIG. 1, see FIG. 8). The vertical support leg 18 is preferably positioned along an angle which is essentially perpendicular to the angle of the front and rear legs 13, 14. The combination of folded symmetrical sides of the metal sheet form these portions of the frame. At this point in the process, the frame is essentially formed with all necessary bends, curves, and connected parts, without the need for any welding or melting of any kind.

It is further noted, that after folding, the lower back end 2 of the frame is wider than both the lower front end 3 of the frame and the upper back end 4 of the frame. In other terms, the distance between the folded portions of the frame comprising the rear leg 14 is greater than the distance between the folded portions of the frame comprising the front leg 13 as well as the distance between folded portions comprising the body 12. This shape is preferable in order to provide space for the back wheel of the bike employing the folded frame. Such a shape and bending angle is also optimal for carrying the weight applied to the top of the frame via the rider and any potential secondary passenger. The folded frame also comprises pre-formed holes: (1) a hole for connecting the primary bike seat 5, (2) a hole for connecting the handlebars/front wheel 6, (3) holes for connecting pedals/gears 7, and (4) holes for connecting a back wheel/gears 8.

Figure 4:
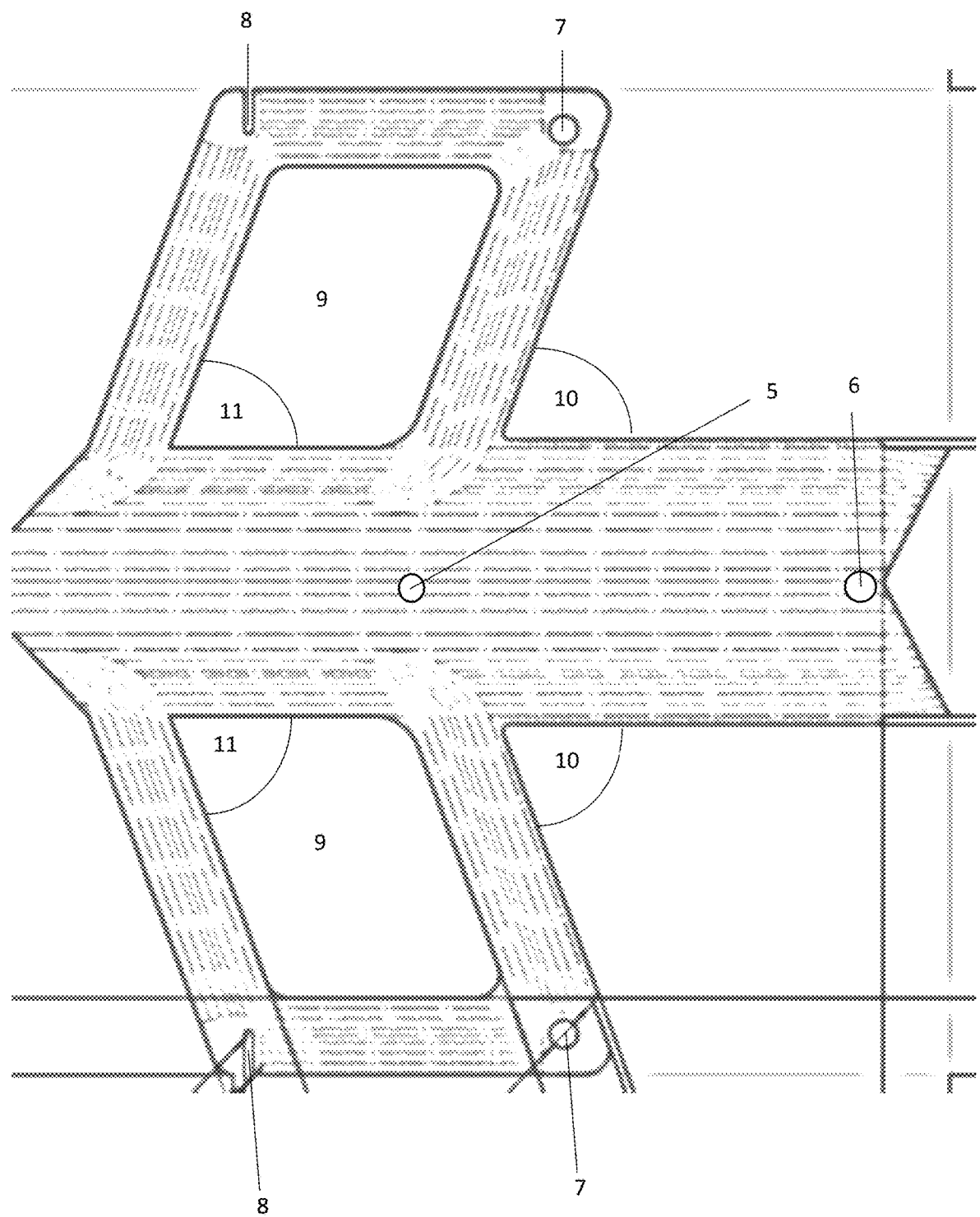
FIG. 4 shows an exemplary hydroformed sheet of metal prior to being folded to form the folded bicycle frame of the present invention. The dashed lines are provided to specifically illustrate the indentations, curves, and bends of the frame design.

Referring now to FIG. 4, the sheet of metal is cut via a guillotine shear press to form a metal sheet comprising the boundary design of the desired frame. The holes 5, 6, 7, 8 may be formed during the shearing process, or preferably during the hydroforming process. Openings 9 between the legs of the frame may also be formed during the shearing process. Preferably, the openings 9 are formed during the hydroforming process. The angles 10 between the front leg of the frame and the body of the frame are equal and are configured to match the angle of a standard bicycle seat pole, such that any standard bicycle seat can be installed and used with the folded frame. The angles 11 between the rear leg and the body of the frame are also equal but are not required to be a standard angle and thus may range so long as they are equal on either side of the frame. In this example, the angles 10, 11 are the same; however, they need not be the same. Preferably, and especially if a secondary seat is to be coupled to the frame behind the primary seat, the angle 11 is an acute angle, thus providing extra space for the secondary seat position.

Figure 2:
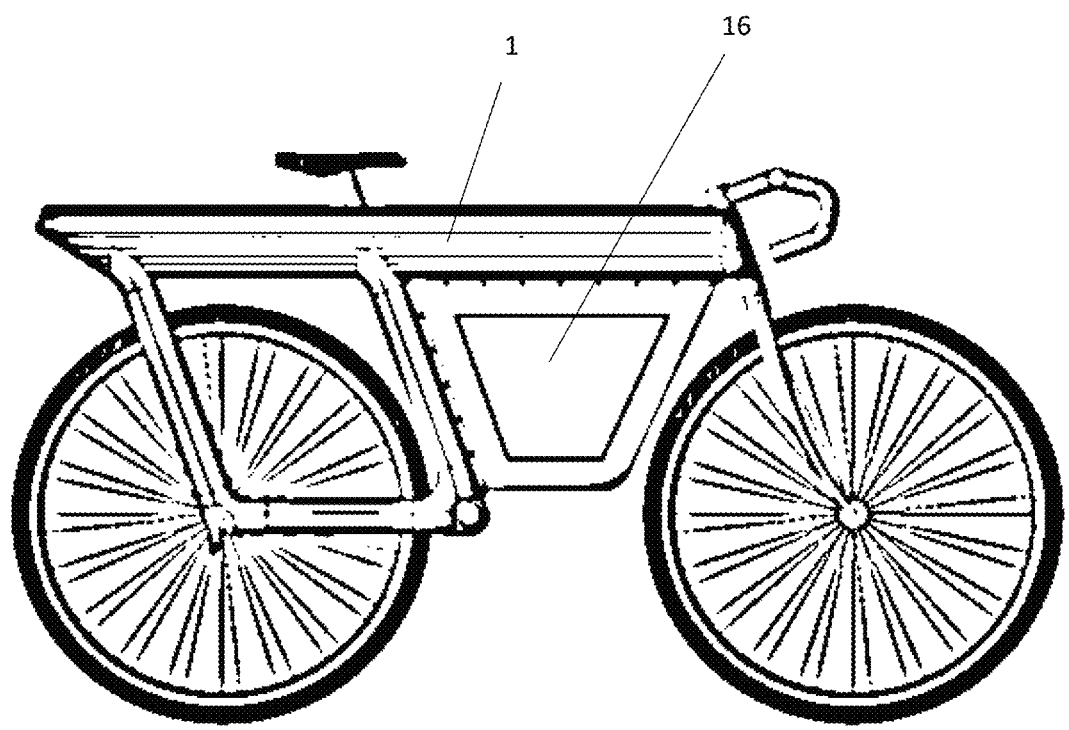
FIG. 2 shows side view of a folded bicycle frame according to the present invention coupled to additional bicycle parts.
Figure 3:
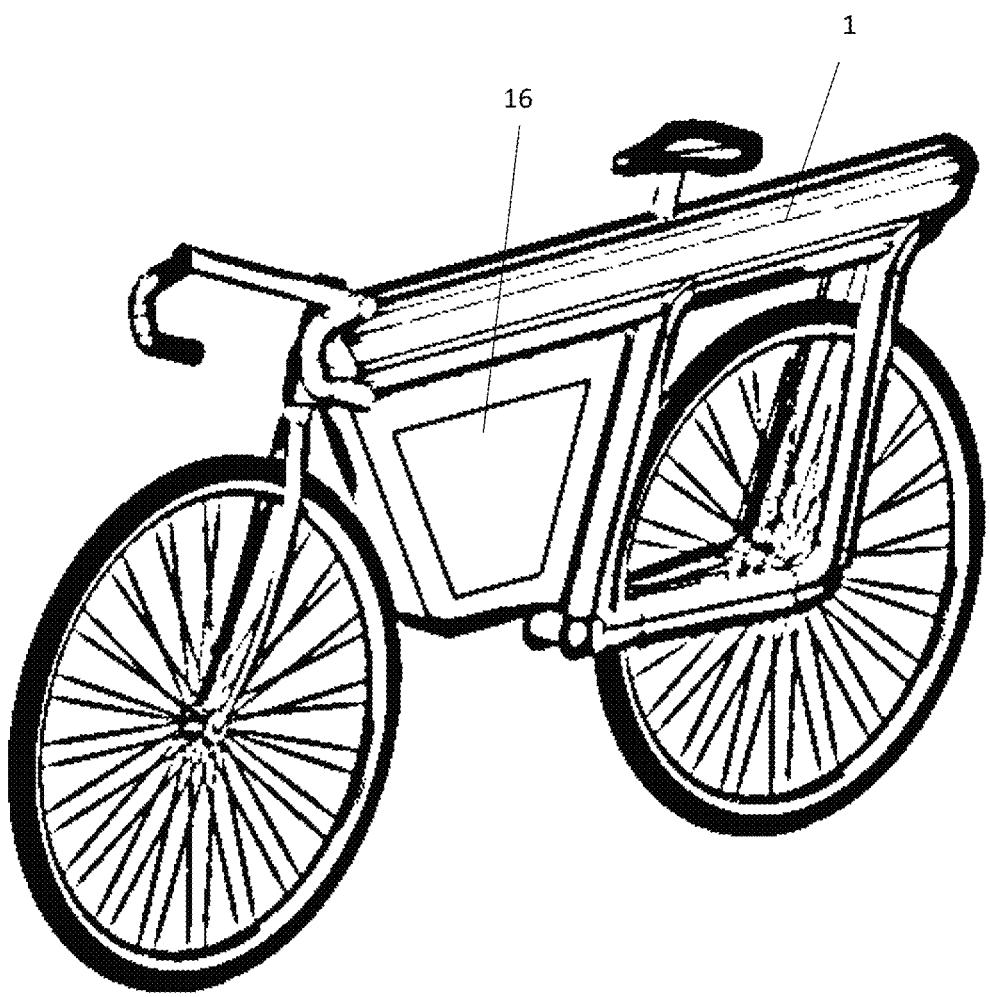
FIG. 3 shows a perspective view of the same frame as that shown in FIG. 2.
Figure 5:
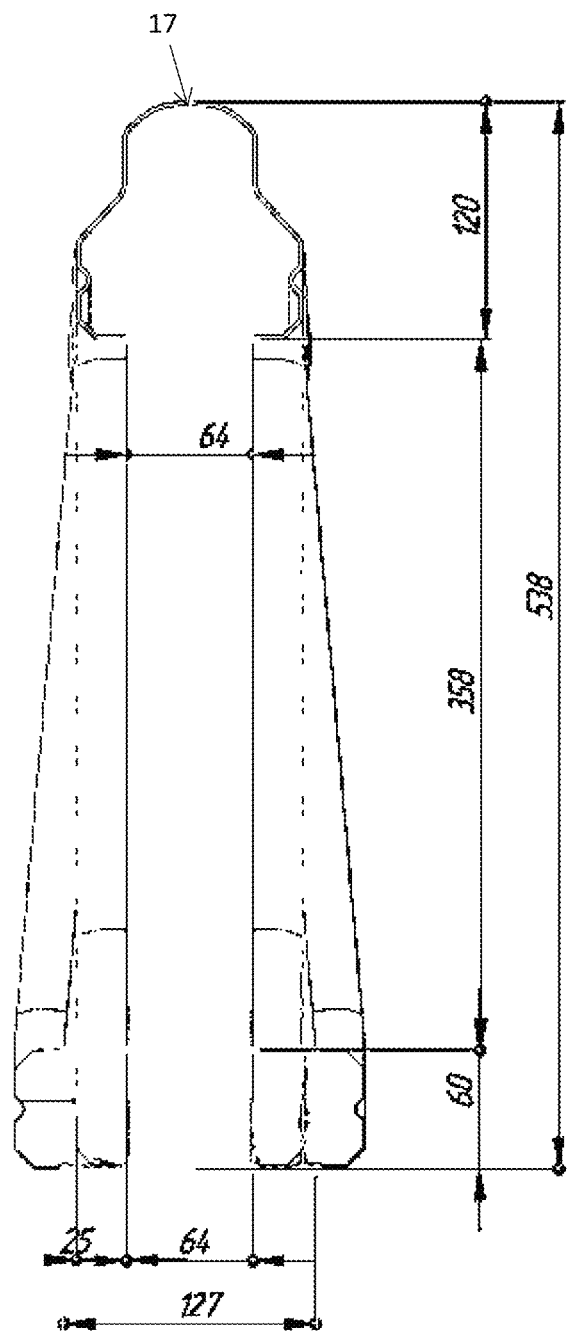
FIG. 5 shows a front view of an entire folded bicycle frame according to the present invention, with exemplary dimensions, in millimeters.

The metal sheet may comprise titanium, aluminum, or steel. After the metal sheet is molded via a hydroforming process, which provides for all necessary frame stiffness profiles, bends, grooves, and holes, the metal sheet is folded essentially along its axis of symmetry 17. See FIGS. 5-7, which illustrate front views of folded frame with exemplary dimensions. The folding process may be performed manually (by hand), with the assistance of tools, or automatically (i.e., completely via machine). After being folded, the lower front end 3 of the frame is fixed to a pedal assembly and thus a width of the lower front end 3 of the frame is maintained (e.g., 68 mm wide for a Shimano pedal assembly). This one fixation of the lower front end 3 of the frame maintains the bend in the frame when additional pressure is exerted on it. However, the multi-functional box 16 also provides a fixation, as well as the coupling of the back wheel/gears to the lower back end 2 of the frame. It is noted that the multi-functional box 16 is mounted to fit adjacently with the frame, as shown in FIG. 2. The multi-functional box 16 is positioned anterior to the front leg of the frame and underneath the body. Its shape is designed to fit snugly into this position such that adjacent support exists along both the body and front leg of the frame.

At the bike assembly site, the handlebars may be coupled to the frame via placing the handlebar tube through the handlebar opening 6 of the frame and using a glue, e.g., an elastomeric structural adhesive, to maintain its position.

In the case of a steel or aluminum frame, the frame may be painted prior to coupling with the parts noted above.

Finally, additional bicycle parts are added to the frame—such parts include but are not limited to the front wheel, back wheel, handlebars, fork, multi-functional box, seat, passenger seat, lighting, and battery (in the case of an electric bicycle).

Figure 9:
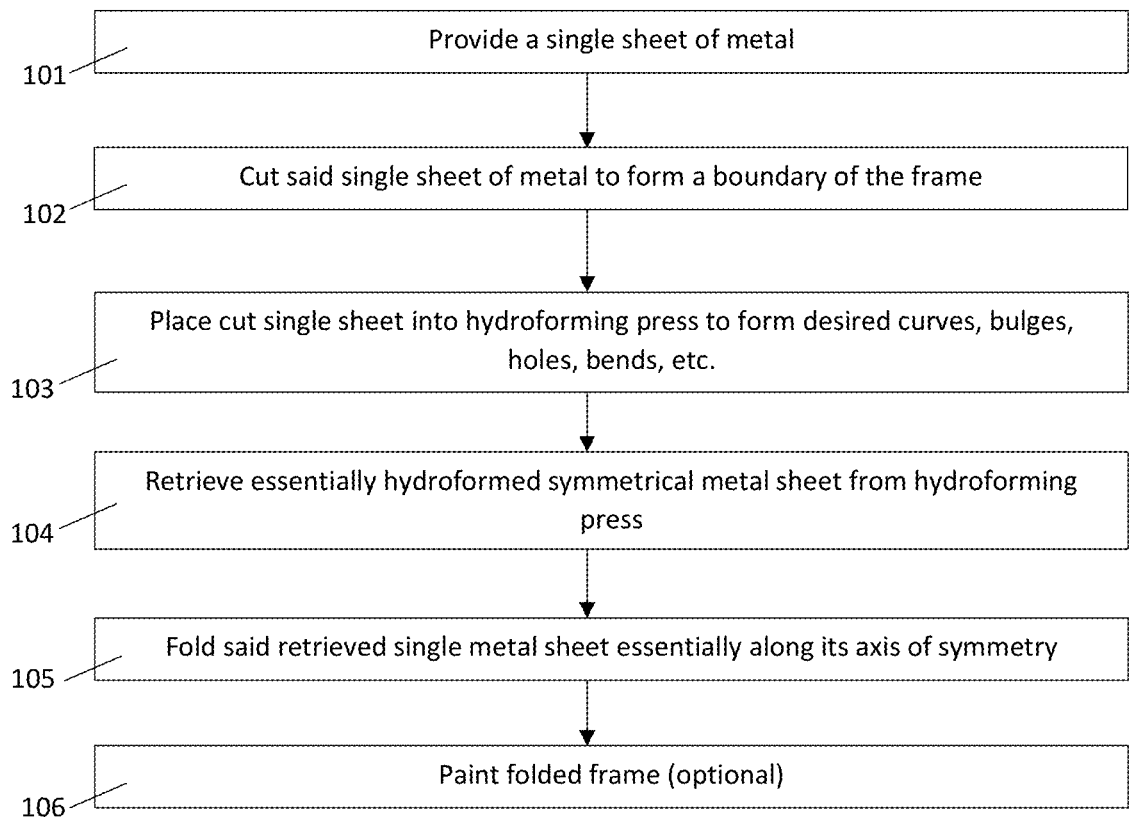
FIG. 9 is a flowchart illustrating the process of making a folded bicycle frame according to the present invention.

The method for making the folded bicycle frame thus comprises the following steps (See FIG. 9):

(1) Providing a single sheet of metal (the metal can be aluminum, titanium, or steel) 101;

(2) Cutting said single sheet of metal to form a boundary of the bicycle frame 102, the metal sheet remaining flat;

(3) Hydroforming said cut single sheet of metal (i.e. placing said cut single sheet of metal into a hydroforming press) to form bulges, holes, bends, and curves along said single sheet of metal (i.e. along its profile) 103;

(4) Retrieving said single sheet of metal with protrusions from the hydroforming process, wherein bulges, holes, bends, and curves formed in the sheet of metal are essentially symmetrical 104;

(5) Folding said retrieved single sheet of metal essentially along its axis of symmetry, wherein a folded form of said single sheet of metal forms the bicycle frame 105—only the upper curve (R30, FIG. 6) is formed by bending an already integral frame which is preformed via hydroforming of the metal sheet on the hydroforming press; and (6) Optionally, if the frame is aluminum or steel, the frame is painted 106.

Types of Hydroforming Molds Used.

The design of the hydroforming mold may vary depending on the type of frame desired. The figures show only some embodiments of the types of frames which are made via the method of the present invention.

Types of Bicycle Frames Produced.

Figure 10A:
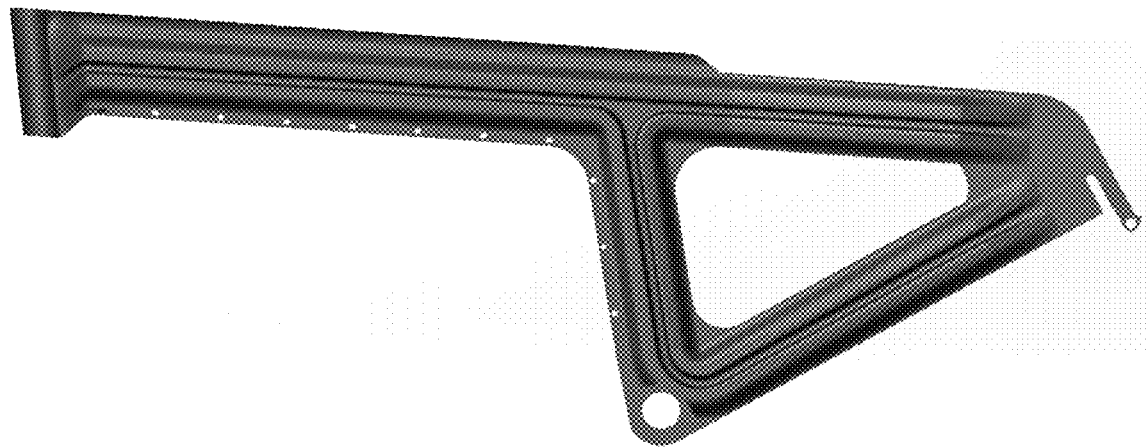
FIGS. 10A-10D illustrate another embodiment of the folded bicycle frame of the present invention.
Figure 10B:
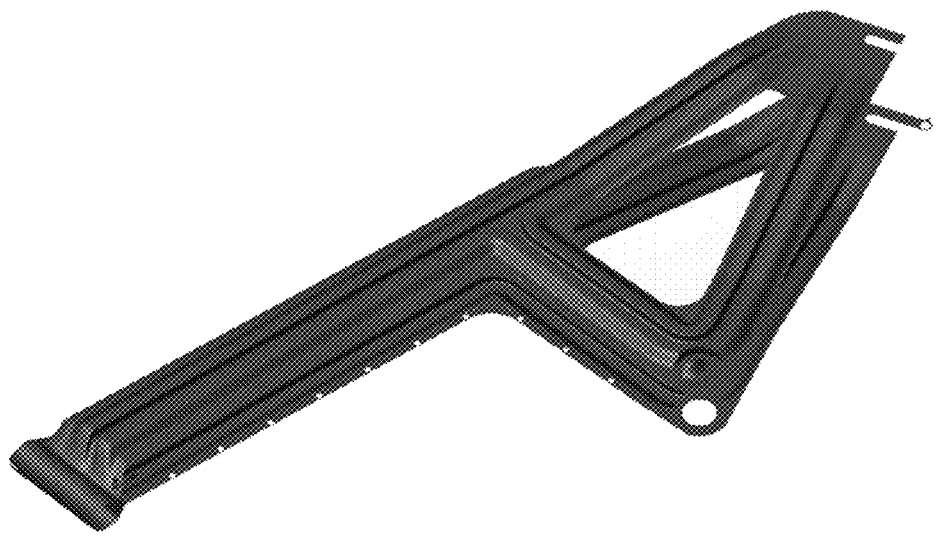
Figure 10C:
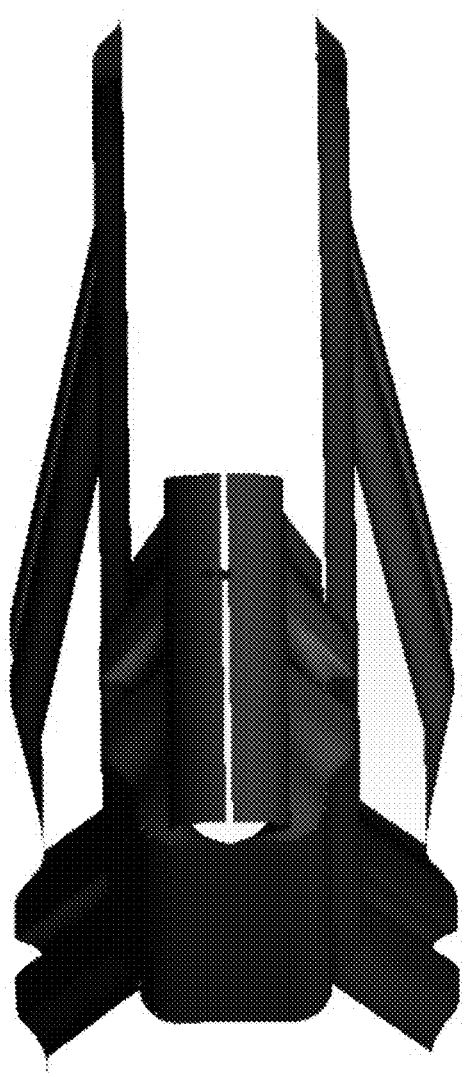
Figure 10D:
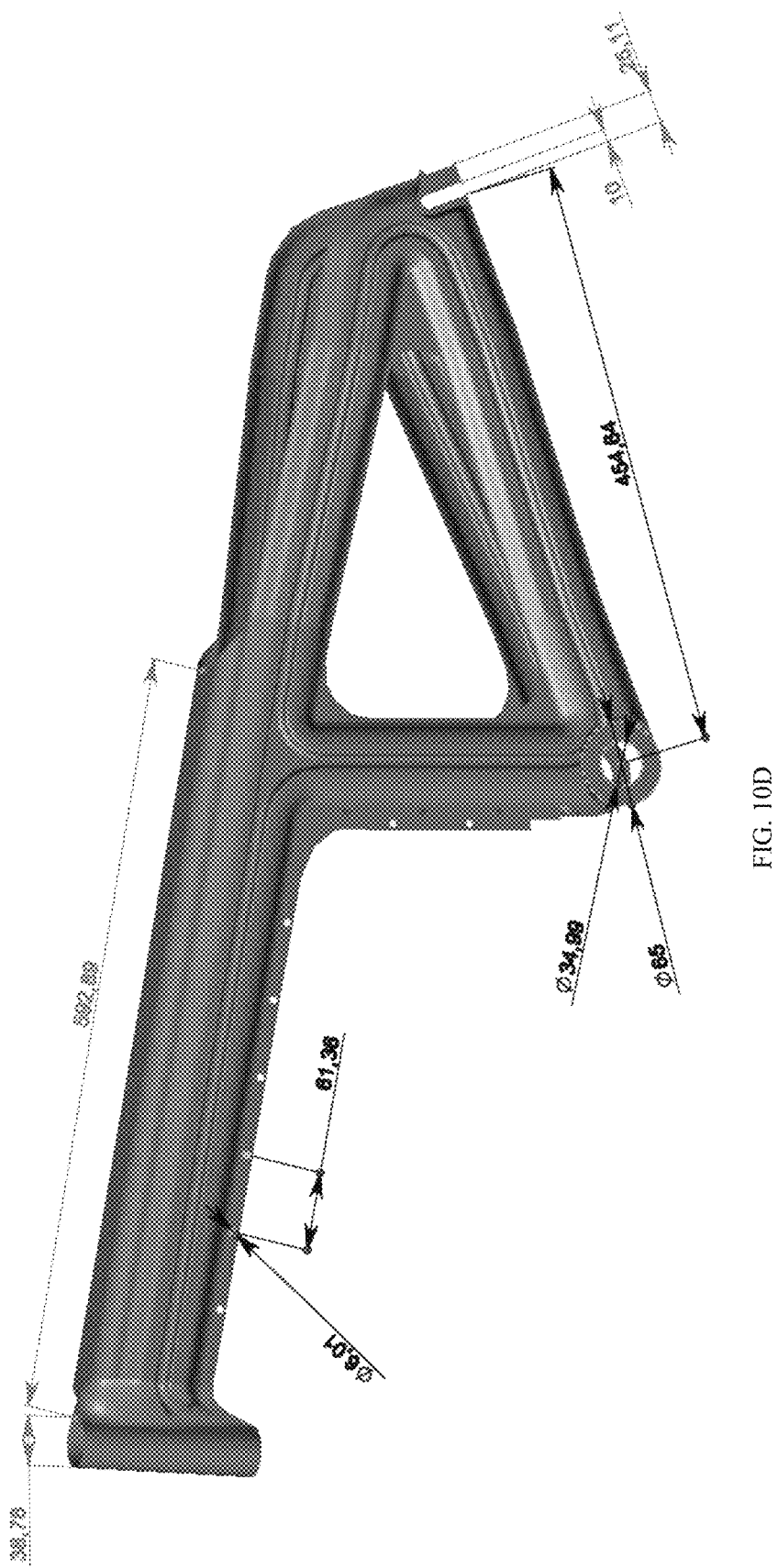
Figure 11A:
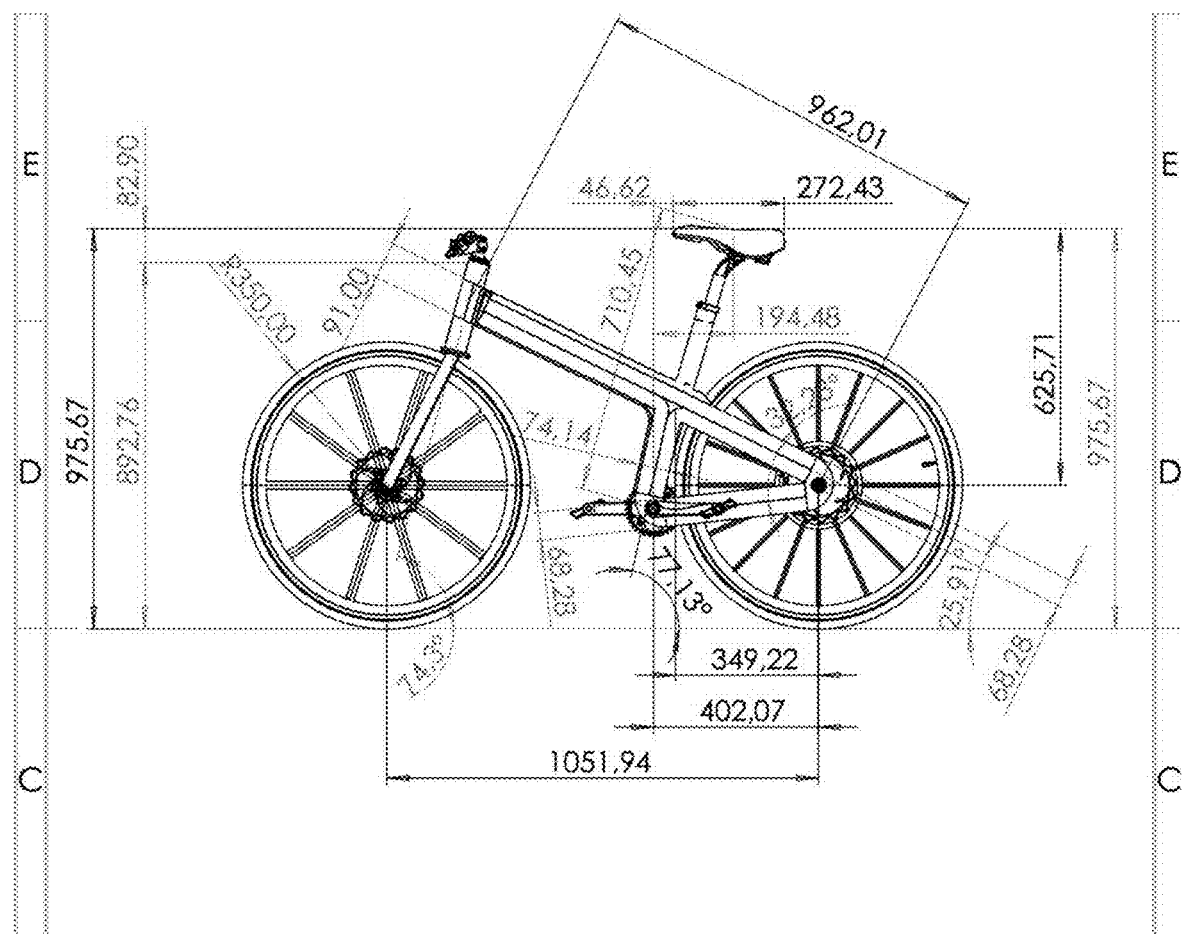
FIGS. 11A-11C illustrate the embodiment shown in FIGS. 10A-10D in a technical manner, showing exemplary dimensions in millimeters.
Figure 11B:
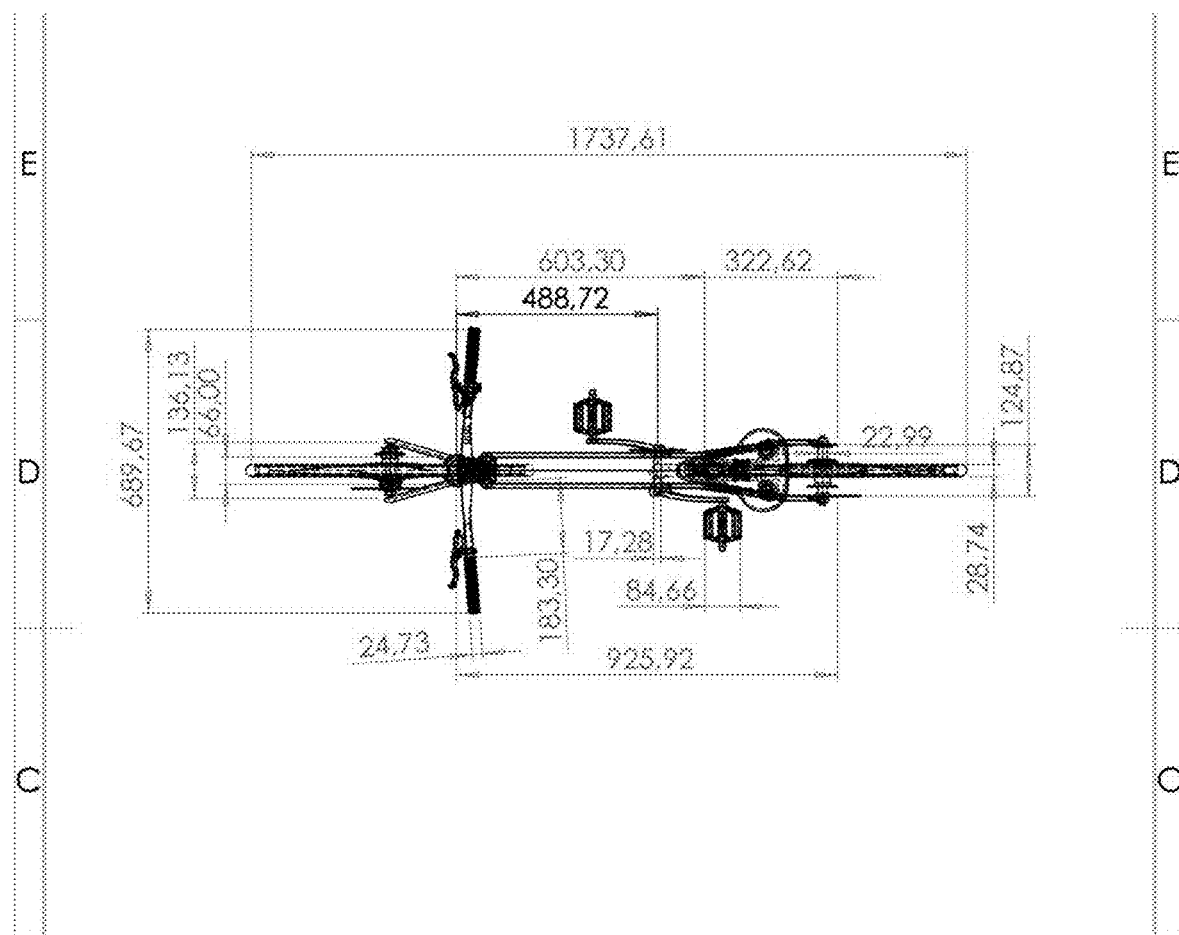
Figure 11C:
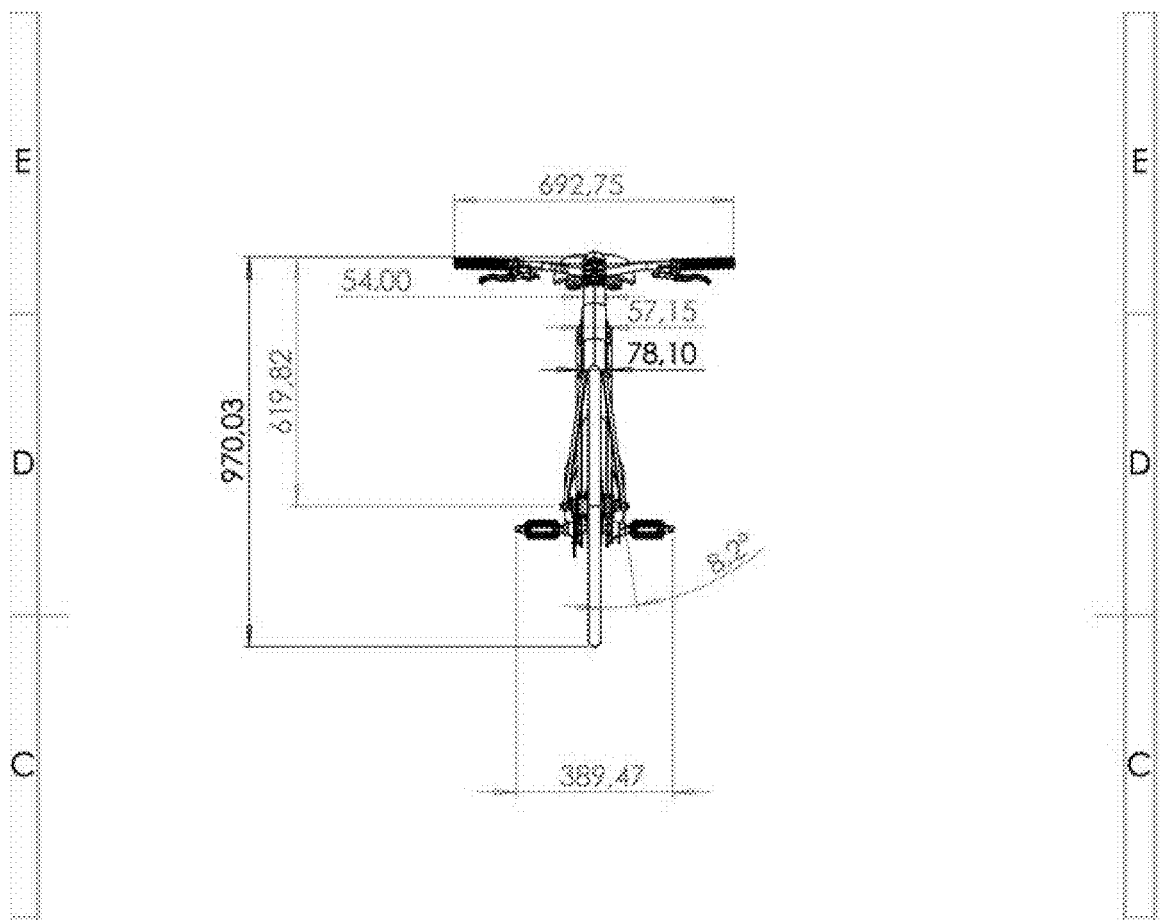

The design of the frame may vary depending on the uses for the bicycle. For example, the types of attachments to the bicycle may dictate the type of frame desired, e.g., boxes for storing items, brackets for tools, inventory transport, brackets for fishing rods, brackets for surfboards, etc. FIGS. 10 and 11 show a second exemplary embodiment of a type of bicycle frame produced. In particular, FIGS. 10 and 11 illustrate an embodiment of the present invention wherein the frame produced comprises at least one triangle, the triangle being formed by a front leg of the frame, a top portion of the frame, and a connecting portion between the bottom of the front leg and an end of the top portion (e.g., a rear end of the top portion). In contrast, FIGS. 1-4 and 8 show an embodiment wherein the frame produced comprises at least one parallelogram. Also, as is shown in FIGS. 10B-10C, the rear end of the triangular frame is wider than the front leg portion of the frame (i.e., the distance between symmetrical parts, when folded, is greatest between the rear end portions of the frame, and the distance between symmetrical parts making up the front leg of the frame is less than the distance between rear end portions). These dimensions provide at least two advantages: (1) there is enough space between parts of the frame to fit a back wheel, and (2) the stability and strength of the frame is increased due to a third dimension, forming a pyramid shape.

Total Weight of the Frame.

If the frame is made from aluminum or aluminum alloys, the total weight is around 2.3 kg per frame, depending on the desired design and attachments. If the frame is made from titanium or titanium alloys, the total weight is around 4.0 kg per frame, depending on the desired design and attachments. Regardless of the material used, the total range of weight of the frame produced via the present invention is between about 1.6-4.0 kg.

Stiffness Curves of the Frame.

Figure 6:
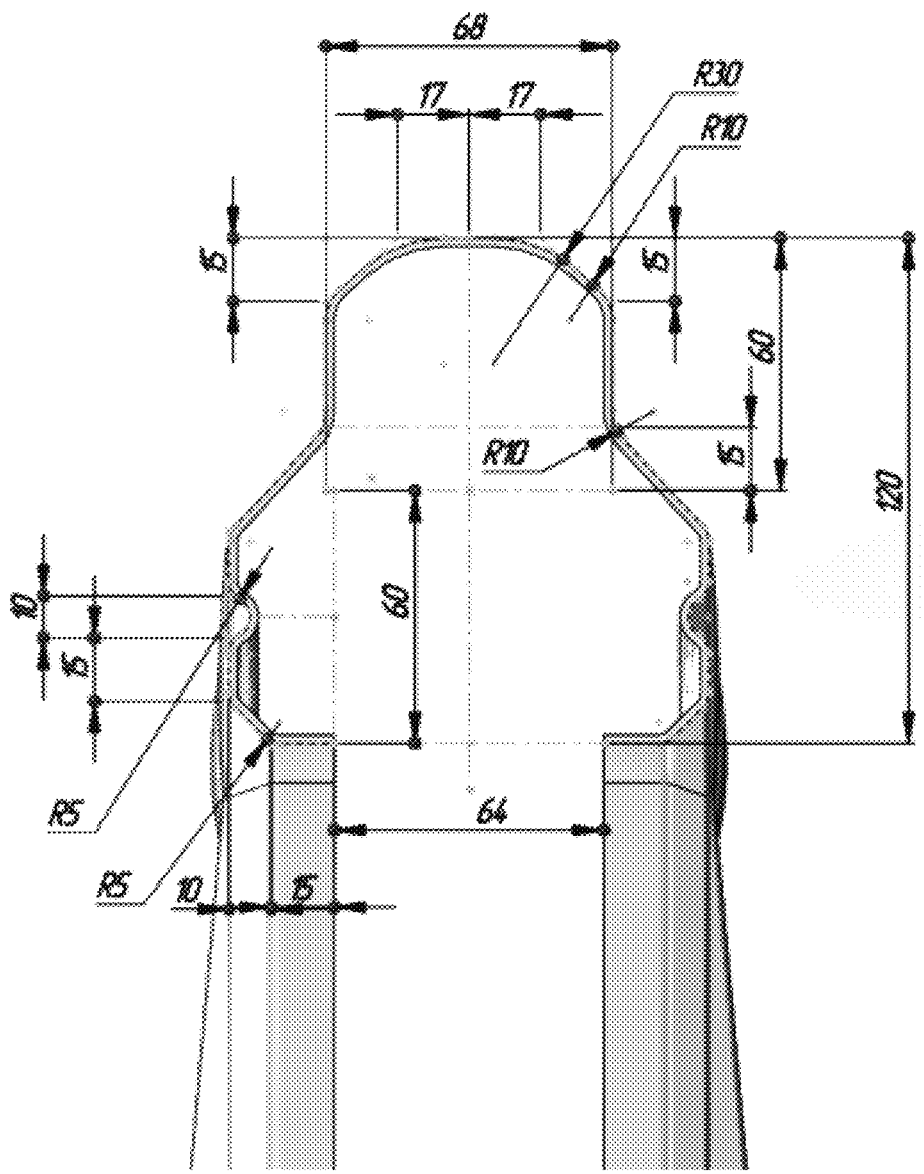
FIG. 6 shows a larger view of the front view shown in FIG. 5, focusing on the upper portion (body) of the frame where the fold is made, with exemplary dimensions, in millimeters.
Figure 7:
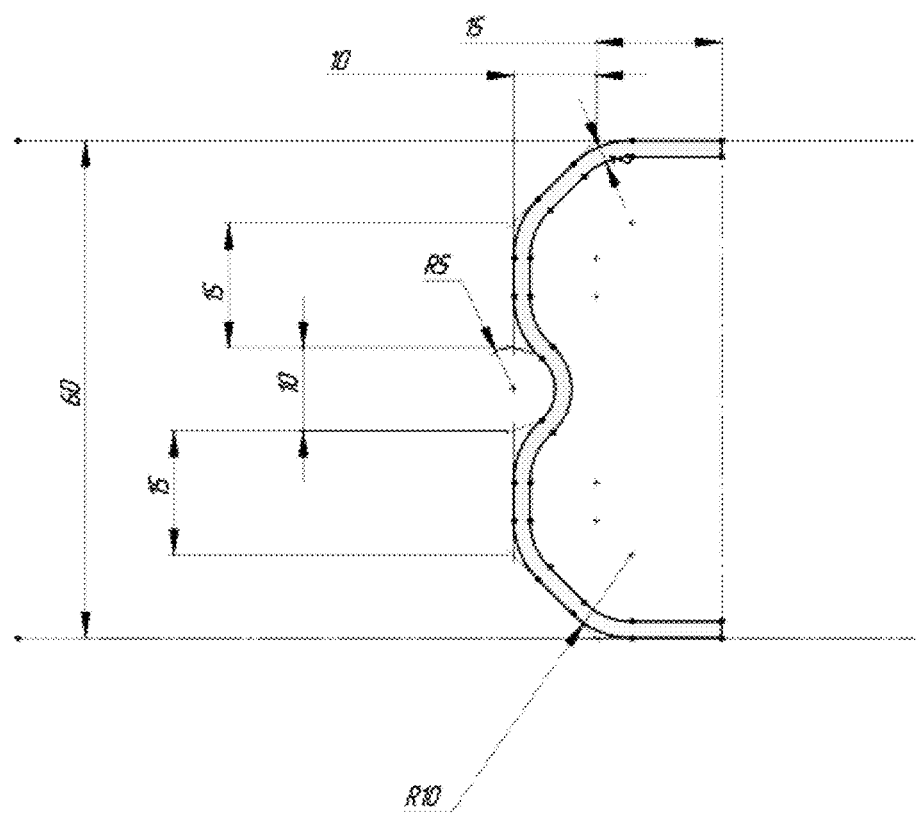
FIG. 7 shows a cross-sectional view of a side portion of a body of the folded bicycle frame, with exemplary dimensions, in millimeters.

The metal sheet of the frame is hydroformed specifically in at least two locations to produce stiffness curves along the frame outline, providing the frame with increased stability and stiffness when in use. The stiffness curve is located on either side of the axis of symmetry prior to bending and on either side of the frame when folded (i.e. after bending). The preferred radius of the stiffness curve is 5 mm, as shown in FIG. 6, labelled R5.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A bicycle frame, comprising:
   a single sheet of metal, said single sheet of metal being cut to form a boundary of the bicycle frame,
   said single sheet of metal comprising bulges and curves along said sheet of metal, said bulges and curves resulting from a hydroforming process, said single sheet of metal being essentially symmetrical,
   said single sheet of metal being folded essentially along its axis of symmetry, wherein a folded form of said single sheet of metal forms the bicycle frame.

2. The bicycle frame of claim 1, wherein a lower back end of the frame is wider than both a lower front end of the frame and an upper back end of the frame.

3. The bicycle frame of claim 1, further comprising a pedal assembly mounted to a lower front end of the bicycle frame via a hole for fixing said pedal assembly, said pedal assembly maintaining the frame in a folded form.

4. The bicycle frame of claim 1, further comprising a hole for installing a rear wheel assembly.

5. The bicycle frame of claim 1, further comprising a hole for installing a bicycle seat.

6. The bicycle frame of claim 1, further comprising a hole for installing a handlebar assembly.

7. The bicycle frame of claim 1, wherein the folded form comprises a top portion, a front leg, a rear leg, and a connecting portion between said front leg and said rear leg.

8. The bicycle frame of claim 7, wherein the folded form further comprises a vertical support leg located between said front leg and said rear leg.

9. The bicycle frame of claim 7, wherein an angle of the front leg is equal to an angle of the rear leg.

10. The bicycle frame of claim 9, wherein the angles are acute angles.

11. The bicycle frame of claim 7, further comprising a multi-functional box, said multi-functional box being mounted adjacent to the frame, underneath the body, and anterior to the front leg.

12. The bicycle frame of claim 1, wherein the metal is aluminum.

13. The bicycle frame of claim 1, wherein the metal is titanium.

14. The bicycle frame of claim 1, wherein the metal is steel.

15. The bicycle frame of claim 1, wherein the folded form comprises a top portion, a front leg, and a connecting portion between a bottom of said front leg and an end of said top portion.

16. The bicycle frame of claim 15, wherein the folded form comprises at least one triangle.

17. The bicycle frame of claim 15, wherein a rear end of the frame is wider than the front leg of the frame.

18. A method for making a bicycle frame, comprising:
    providing a single sheet of metal,
    cutting said single sheet of metal to form a boundary of the bicycle frame,
    hydroforming said cut single sheet of metal to form bulges and curves along said single sheet of metal, said single sheet of metal with bulges and curves being essentially symmetrical,
    folding said single sheet of metal essentially along its axis of symmetry,
    wherein a folded form of said single sheet of metal forms the bicycle frame.

19. The method of claim 18, further comprising forming one or more holes in the single sheet of metal.

20. The method of claim 18, wherein the folding of the single sheet of metal forms a frame comprising a top portion, a front leg, a rear leg, and a connecting portion between said front leg and said rear leg.

\* \* \* \* \*